United States Patent
Von Borstel

(10) Patent No.: US 6,624,386 B2
(45) Date of Patent: Sep. 23, 2003

(54) LASER PROCESSING MACHINE WITH GAS FLUSHED BEAM GUIDING CHAMBER

(75) Inventor: Michael Von Borstel, Pleidelsheim (DE)

(73) Assignee: Trumpf Lasertechnik GmbH (DE)

( * ) Notice: Subject to any disclaimer, the term of this patent is extended or adjusted under 35 U.S.C. 154(b) by 0 days.

(21) Appl. No.: 09/927,819

(22) Filed: Aug. 10, 2001

(65) Prior Publication Data

US 2002/0040894 A1 Apr. 11, 2002

(30) Foreign Application Priority Data

Aug. 12, 2000 (EP) .............................. 00117505

(51) Int. Cl.$^7$ ............................. B23K 26/14
(52) U.S. Cl. ................................. 219/121.84
(58) Field of Search .................... 219/121.84

(56) References Cited

U.S. PATENT DOCUMENTS

| | | |
|---|---|---|
| 3,685,882 A | 8/1972 | Van Der Jagt |
| 4,467,171 A | 8/1984 | Ramos |
| 5,811,753 A * | 9/1998 | Weick et al. ......... 219/121.84 |
| 6,329,632 B1 * | 12/2001 | Fournier et al. ....... 219/121.73 |
| 6,399,916 B1 * | 6/2002 | Gortler et al. ......... 219/121.84 |

FOREIGN PATENT DOCUMENTS

| | | |
|---|---|---|
| DE | 40 01 091 | 7/1991 |
| DE | 43 05 107 | 8/1994 |
| EP | 0 749 800 A | 12/1996 |
| GB | 2163692 | 3/1986 |
| JP | 4-344886 A * | 12/1992 |
| JP | 11-347772 A * | 12/1999 |

* cited by examiner

Primary Examiner—Geoffrey S. Evans

(57) ABSTRACT

A laser processing machine incorporates a gas flushed beam guiding chamber (3) and an optical element (2) bounding the beam guiding chamber (3) on the beam input side serves the optical element to direct the laser beam (4) into the beam-guiding chamber (3), and a flushing gas intake opening (10) is provided in the beam-guiding chamber (3) near the optical element (2). An optical diaphragm aperture (7, 21) is provided in the beam guiding chamber (3) for shaping the laser beam (4) and it is designed to also serve as a restrictor for the flushing gas. The diaphragm subdivides the beam guiding chamber, and, since only the part of the beam guiding chamber between the optical element and the diaphragm is subject to positive pressure, the amount of flushing gas needed for flushing is reduced.

13 Claims, 4 Drawing Sheets

LASER PROCESSING MACHINE WITH GAS FLUSHED BEAM GUIDING CHAMBER

BACKGROUND OF THE INVENTION

This invention relates to a laser-based processing machine incorporating a gas-flushed beam guiding chamber and an optical element providing the end of the beam guiding chamber on the beam input side and serving to direct the laser beam into the beam guiding chamber and to the pressurized beam guiding chamber. A flushing gas intake opening is provided in the beam guiding chamber near the optical element. It also relates to a method for protecting an optical element located in the gas-flushed laser beam guiding chamber against contaminants.

Such laser-based processing machines are known and have been described in the patent literature, e.g., EP 0 749 800.

A laser beam impinging on an optical element is not totally reflected or transmitted; instead, a small part of it is absorbed which leads to a heat buildup in the optical element. Any fouling of the optical element by external contaminants increases the level of absorption of the laser beam. This additionally absorbed laser power can damage the optical element, shortening its useful life while also reducing the effective laser power.

In the laser processing machine described in EP 0 749 800, air with a specific $CO_2$ content is fed into a tubular beam guide. The air serves the purpose of flushing the tubular beam guide, thus keeping the laser beam free of performance-reducing gases and particles. The air is fed into the tubular beam guide through an air intake near the optical window through which the laser beam is directed from the laser resonator into the tubular beam guide. The wall at the other end of the tubular beam guide is provided with an air outlet opening equipped with an adjustable diaphragm serving to regulate the amount of air discharged and thus to control the positive pressure within the tubular beam guide.

In the laser processing of materials, for instance when cutting or welding with a laser, the processing result depends on the power density and beam quality of the laser beam. To obtain the desired processing results, it is often necessary to adjust precisely the radius of the laser spot on the workpiece. Apart from its laser mode, a laser beam contains diffraction components which have a larger beam radius and distant field divergence pattern than does the laser mode. When an optical element focuses the laser beam on a metal plate that is to be processed, the diffraction components are situated outside the laser-mode beam radius, leading to an undesirable buildup of heat outside the beam radius of the laser mode. Therefore, prior art laser systems incorporate optical diaphragms for beam forming and especially for filtering out the diffraction components.

It is the object of the present invention to provide a novel and improved laser guide chamber assembly containing an optical element in which the amount of flushing gas needed for protecting the optical element from laser beam affecting contaminants is minimized.

It is also an object to provide such a laser guide chamber assembly which is relatively simple in construction and reliable in operation.

SUMMARY OF THE INVENTION

It has now been found that the foregoing and related objects may be readily attained in a laser processing machine including a gas flushed beam guiding chamber, and an optical element providing an end of the beam guiding chamber on the beam input side and serving to direct the laser beam into the beam-guiding chamber. A flushing gas intake opening is provided in the beam guiding chamber near the optical element, and an optical diaphragm aperture is provided in the beam guiding chamber for shaping the laser beam and also serving as a restrictor for flow of the flushing gas therethrough.

In one embodiment the laser processing machine includes a focussing device which focuses the laser beam in the direction of the diaphragm aperture, and this focussing device may be integrated into the optical element. Generally, the focussing device is positioned within the beam guiding chamber. Preferably, the diaphragm is positioned at a distance within the Rayleigh length from the neck of the laser beam focussed by the focussing device.

Desirably, there is included a control device for adjusting the diaphragm. The diaphragm aperture is circular and its diameter is smaller than $$\frac{4\sqrt{2}\,f\lambda}{\pi dK}$$ when the diaphragm is positioned at the neck of the laser beam or $$\frac{8f\lambda}{\pi dK}$$ when the diaphragm is positioned within the Rayleigh length Wherein f is the focal length of the focussing device, d is the diameter of the laser beam, and K is the characteristic factor of the beam.

The intake opening directs the flushing gas flowing into the beam guiding chamber at the optical element parallel to the surface of the optical element Alternatively, the intake opening directs the flushing gas flowing into the beam guiding chamber away from the optical element. In the most customary embodiment, the aperture and the restrictor are provided by a cutting gas nozzle on the cutting head of a laser processing machine and the flushing gas also serves as a processing gas in the laser cutting process.

The salient advantage of the laser processing machine according to this invention lies in the fact that the diaphragm subdivides the beam guiding chamber and only the part of the beam guiding chamber between the optical element and the diaphragm needs to be under positive pressure. The amount of gas needed for flushing is correspondingly reduced. The flushing gas is preferably fed into the beam guiding chamber through a gas inlet equipped with a flow control device. In this fashion, the pressure within the beam guiding chamber can be so regulated to build up positive pressure, and with the diaphragm aperture constitutes a restrictor port for the flushing gas flowing through the beam guiding chamber.

The laser beam is preferably focussed onto the diaphragm by means of a focussing device and is bent at the diaphragm aperture. Especially in the case of a long laser beam path the beam radius can be held small and the laser beam can be directed to the focussing device with only minor losses. The focussing device may be positioned inside the beam guiding chamber or integrated into the optical element. In the latter case, the beam guiding chamber can be of a correspondingly smaller design. This also reduces light losses which occur in optical elements in any imaging process. In conjunction with the focussing device that is positioned behind the diaphragm, the focussing device which concentrates the laser beam toward the diaphragm may be combined into a Kepler telescope.

The diaphragm does not have to be located at the focal point of the laser beam, and it may be positioned for instance in front of the focal point which further reduces the part of the beam guiding chamber that needs to be pressurized. In preferred design versions, the diaphragm is located within the Rayleigh length from the neck of the laser beam focussed by the focussing device. In the area of the beam neck the spatial separation between the laser mode and the diffraction components is the largest, providing at this point an opportunity to filter out the diffraction components, while minimizing the losses in the laser mode.

A particular advantage is derived from making both the diaphragm and the diaphragm aperture adjustable. The position of the diaphragm and the diaphragm aperture can thus be adapted to the location of the neck of the focussed laser beam, to the laser power, to the processing job involved, and to the temperature of the diaphragm. Especially in materials processing applications it is necessary to precisely select the beam radius at the processing point in order to obtain the desired processing result.

In the case of a circular diaphragm aperture the diameter of the aperture is preferable smaller than, for instance, $$\frac{4\sqrt{2}\,f\lambda}{\pi dK} \text{ when the diaphragm is positioned at the neck of the laser beam}$$

or $$\frac{8f\lambda}{\pi dK} \text{ when the diaphragm is positioned within the Rayleigh length}$$

where f is the focal length of the focussing device, $\lambda$ is the wavelength of the laser, d is the diameter of the laser beam at the focussing device and K is the characteristic factor of the beam.

After verification of the necessary purity level of the flushing gas such as helium, nitrogen or other inert gases, the gas flow can be initiated and directed at the optical element or in parallel fashion past the optical element into the beam guiding chamber. Otherwise, for instance when using compressed air or the filtered exhaust air from a vacuum pump that draws laser gas from the laser resonator, the flushing gas should be introduced away from but as close as possible to and past the optical element into the beam guiding chamber. The orientation of the gas flow entering the beam guiding chamber relative to the optical element can be adjusted for instance by means of a nozzle provided at the intake opening.

In particularly preferred design versions of this invention, the aperture and the restrictor port are in the form of a cutting gas tip at the processing tool head of the laser processing machine. The cutting gas tip doubles as the optical aperture for the laser beam and the flushing gas also serves as a processing gas in the laser processing operation, for instance in purging liquid substances from the groove or slot the laser beam has cut into a sheet-metal workpiece.

As part of the method first above mentioned, this particular objective is achieved by setting the pressure of the gas flowing through and flushing the beam guiding chamber in such fashion that an optical diaphragm aperture provided in the beam guiding chamber for shaping the laser beam simultaneously operates as the restrictor for the flushing gas.

This invention also relates to the concurrent use of an optical aperture for a laser beam as a restrictor port for a flushing gas, and to the use of a cutting-gas tip as an optical aperture for a laser beam and as a restrictor port for a flushing gas that also serves as a processing gas.

Other advantages will be evident from the following description and from the drawings. According to the invention, the features described above and those discussed further below can be applied individually as discrete features or in any desired combination. The embodiments described and illustrated are not to be viewed as a finite and final enumeration but only as examples serving to explain this invention. In the drawings—

BRIEF DESCRIPTION OF THE ATTACHED DRAWING

DETAILED DESCRIPTION OF THE ILLUSTRATED EMBODIMENTS

Figure 1:
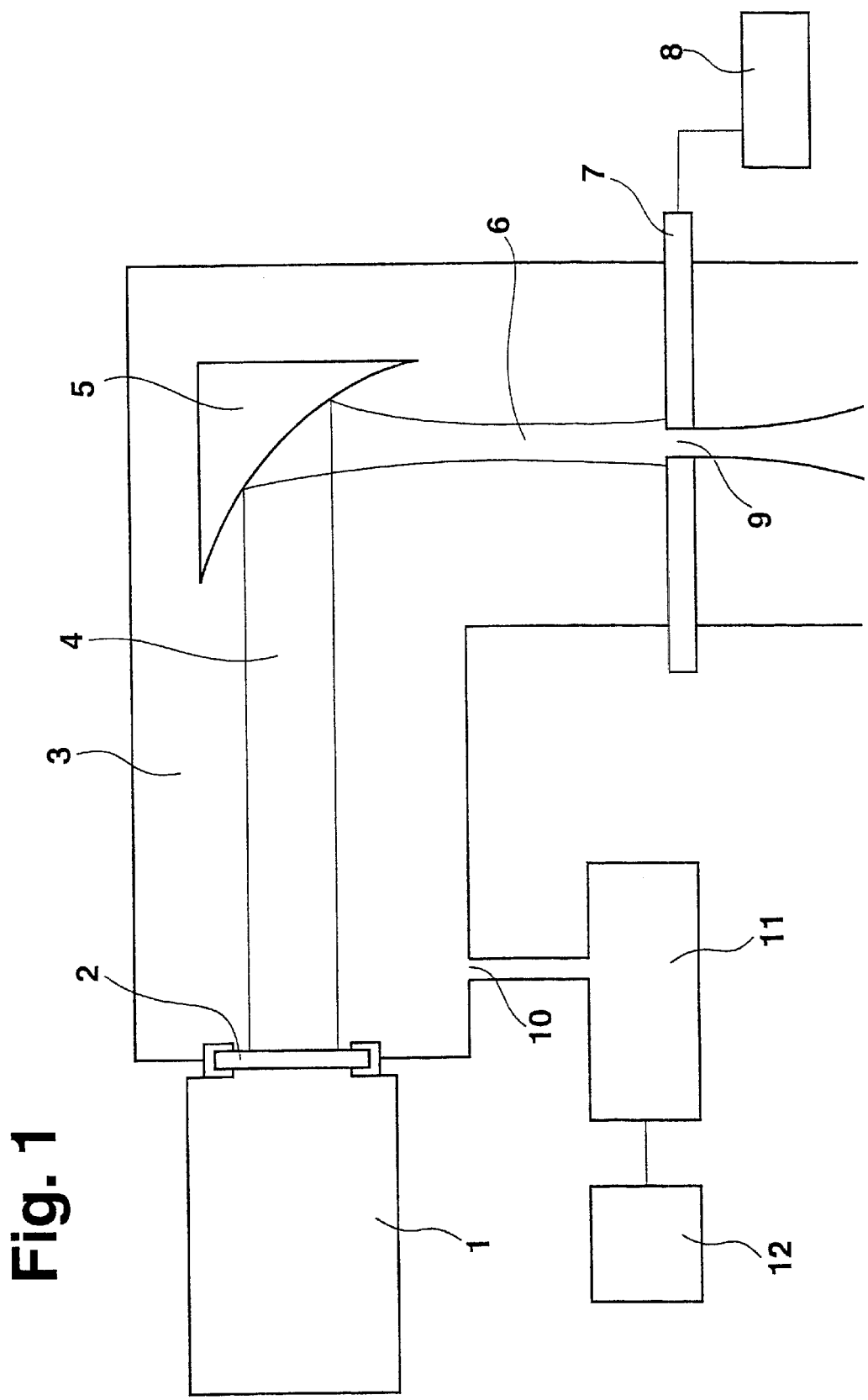
FIG. 1 shows a first embodiment of the laser based processing machine of this invention with the processing or cutting head not illustrated.

In the laser processing machine illustrated in FIG. 1, a laser beam 4 emanating from a laser resonator 1 is directed through an optical element in the form of a window 2 into a beam guiding chamber 3 and onto a focussing device 5 in the form of a focussing mirror. The focussing mirror focuses the laser beam 4 in the direction of the diaphragm 7 in the beam guiding chamber 3. The diaphragm 7 is located within the Rayleigh length from the neck of the focussed laser beam 6, which makes it possible to blank out the diffraction components with only a minimal loss of laser mode power.

By use of the control unit 8, the adjustable aperture 9 is set so small that the diffraction components are masked out. Flushing gas flows through an intake opening 10, flushing gas flows from a gas supply unit 11 into the beam guiding chamber 3 and through the diaphragm aperture 9. The flushing gas serves to keep the surface of the optical window 2 free from contaminants which would increase the amount of energy absorbed by the optical window 2, thus reducing the life of the optical window 2 and negatively affecting the laser beam.

In the design version illustrated, the flushing gas flows from the intake opening 10 more or less parallel to the plane surface of the optical window 2, i.e., at about a right angle (90°) relative to the optical axis of the optical window 2. In other design variations, the flushing gas is directed at or away from the surface of the optical window 2. The control unit 12 regulates the gas feed so that, compared to the ambient air pressure, there is positive pressure in the beam guiding chamber 3 with the diaphragm aperture 9 constituting a restriction for the flow of flushing gas.

The positive pressure prevailing in the beam guiding chamber 3 prevents external contaminants from penetrating therein. Examples of a typical flushing gas include compressed air, filtered exhaust air from a vacuum pump removing laser gas from the laser resonator, helium, nitrogen, or other inert gases. When the flushing gas is to be directed at the optical window 2 or when it flows parallel to its surface into the beam guiding chamber 3, the flushing gas employed should preferably be of high purity. On the other hand, if the flushing gas flows away from the optical window 2 into the beam guiding chamber 3, gas of lower purity may be used. The flushing gas intake opening 10 is preferably close to the optical window 2 since this optimizes the protection of the optical window 2 from contaminants.

In the case of a circular diaphragm aperture 9, the aperture diameter is preferably smaller than about $\frac{4\sqrt{2}\,f\lambda}{\pi dK}$ when the diaphragm is positioned at the neck of the laser beam or $\frac{8f\lambda}{\pi dK}$ when the diaphragm is positioned within the Rayleigh length where f is the focal length of the focussing device 5, λ is the wavelength of the laser, d is the diameter of the laser beam, and K is the characteristic factor of the beam.

With a controlled nitrogen gas ($N_2$) flow into the beam guiding chamber 3 at a rate of 35 liters per minute, the following measurements were taken of the pressure levels in the beam guiding chamber 3 in front of the diaphragm 7 as a function of the aperture diameter in the diaphragm 7:

| Diameter of the diaphragm aperture [mm] | Positive pressure in front of the diaphragm [mbar] |
| --- | --- |
| 0.95 | 4500 |
| 1.6 | 1100 |
| 1.9 | 550 |
| 2.3 | 250 |
| 4.0 | 73 |
| 4.5 | 64 |
| 5.0 | 58 |
| 5.5 | 56 |
| 6.0 | 53 |

The measured relationship between the pressure in the beam guiding chamber 3 and the aperture size of the diaphragm 7 shows that maintaining constant pressure in the beam guiding chamber requires less gas with smaller aperture sizes. Keeping the gas volume at a constant level and reducing the aperture diameter results in better protection of the optical window 2.

Figure 2:
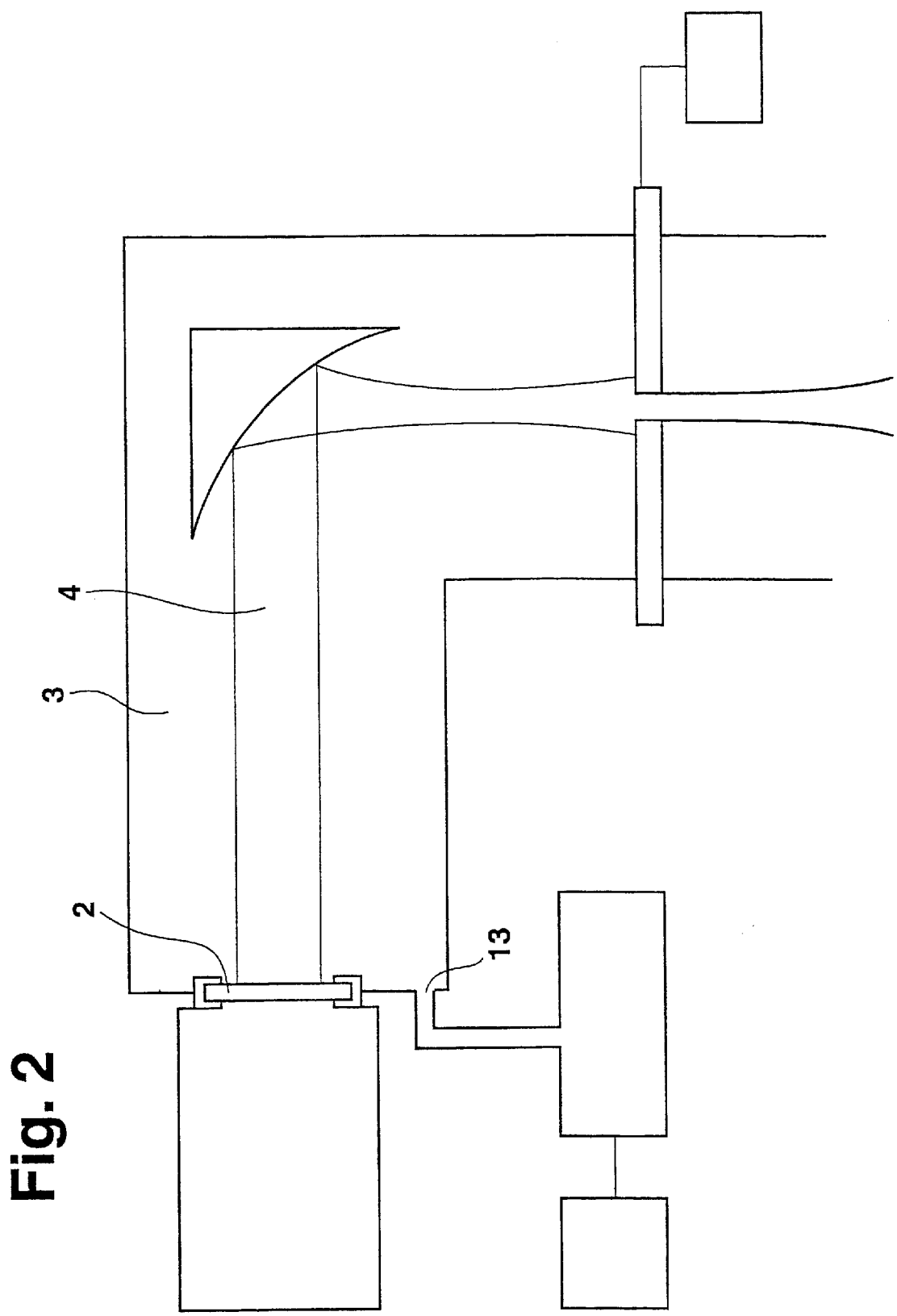
FIG. 2 shows a second embodiment of a laser based processing machine embodying the invention.

The laser processing machine depicted in FIG. 2 differs from the laser processing machine of FIG. 1 in that the flushing gas intake opening 13 opens into the beam guiding chamber parallel to the optical axis of the optical window 2. The flushing gas thus flows through the intake opening 13, away from the optical window 2 and into the beam guiding chamber 3. The advantage of this configuration for the intake opening 13 lies in the fact that lower purity flushing gasses can be employed, such as compressed air or the filtered exhaust air from a vacuum pump which removes laser gas from the laser resonator, because the gas is not directed at the optical window 2.

Figure 3:
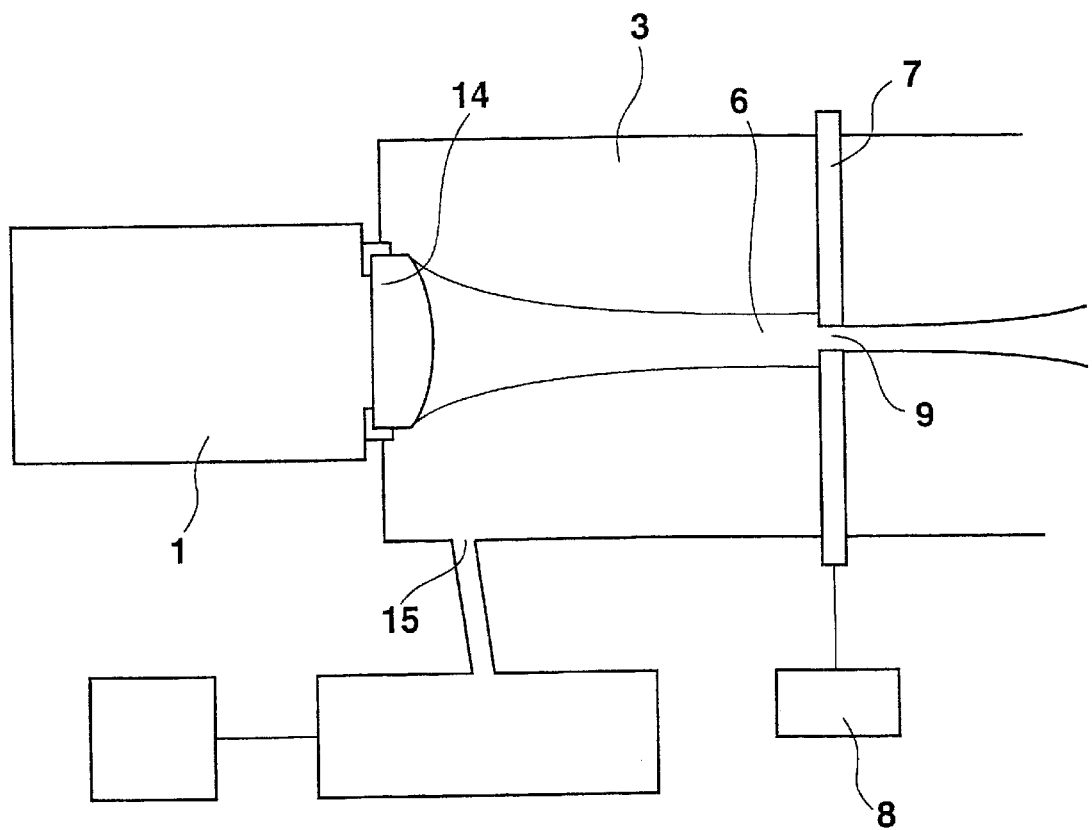
FIG. 3 shows a third embodiment of a laser based processing machine of this invention.

The laser processing machine depicted in FIG. 3 differs from the laser processing machine of FIG. 1 in that the optical window and the focussing device are replaced by one single optical element 14 and that the flushing gas intake opening 15 points toward the surface of the optical element 14 for instance by a nozzle. Emanating from the laser resonator 1, the laser beam passes through the optical element 14 into the beam guiding chamber 3. The optical element 14 focuses the laser beam and directs it toward the diaphragm 7 which is positioned within the light path of the focussed laser beam 6. The flushing gas impinging on the surface of the optical element 14 precludes the deposition of dirt and debris on the optical element 14.

Figure 4:
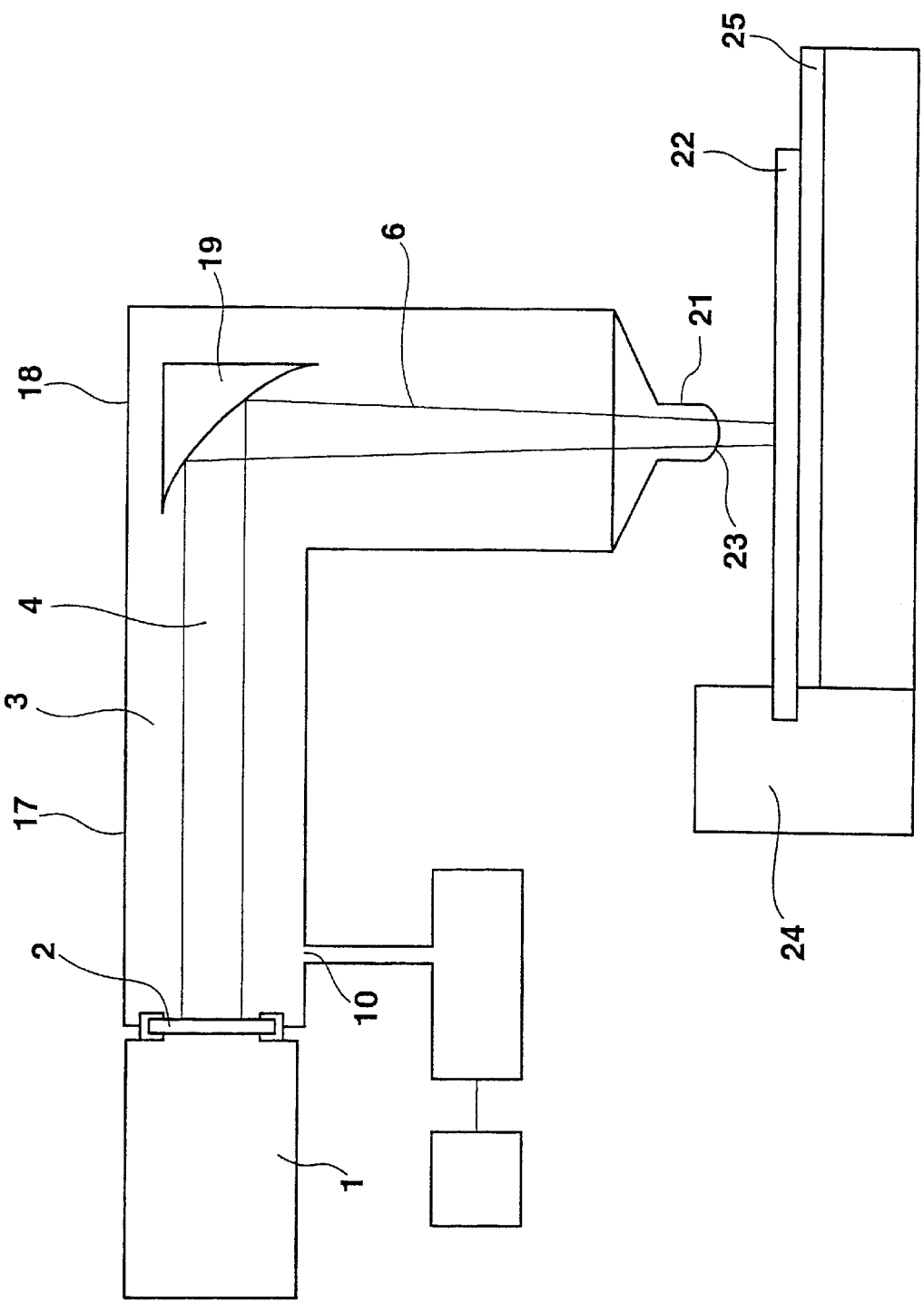
FIG. 4 shows a fourth embodiment example of a laser based processing machine of this invention.

In the laser processing machine schematically illustrated in FIG. 4, the laser beam 4 emanating from the laser resonator 1 is directed through the optical window 2 into a tubular beam guide 17 at the end of which the laser beam 4 enters a cutting head 18. Inside the cutting head 18, a focussing device in the form of a focussing mirror 19 focuses the laser beam 4 through an aperture 21 onto a metal plate 22. The cutting head 18 and the metal plate 22 can be moved relative to each other. In the example illustrated, the cutting head 18 and the tubular beam guide 17 remain stationary while the metal plate is moved for processing.

It is also possible to leave the metal plate in a stationary position during the processing and to move the cutting head with the tubular beam guide. Here, the metal plate 22, supported by a workpiece holder 25, is clamped onto a coordinate drive table 24 which permits X-Y movement of the workpiece relative to the cutting head 18. The combination of tubular beam guide 17 and cutting head 18 constitutes the beam guiding chamber 3 into which the flushing gas enters through the intake opening 10 at the tubular beam guide 17 and from which it exits again through the diaphragm aperture 23 in the cutting head 18. The flushing gas feed into the beam guiding chamber 3 is controlled so as to maintain positive pressure in the chamber, with the diaphragm aperture 23 constituting a restrictor port. In the illustrated embodiment, the flushing gas which is directed onto the metal plate 22 through the tip-shaped aperture 21 also serves as a cutting gas for purging molten and solid substances from the groove or slot cut into the metal plate 22 by the laser beam. The neck of the focussed laser beam 6 is not located at the diaphragm 7; instead, its location is determined by the position of the metal plate 22 and by the intended cutting process.

What is claimed is:

1. A laser processing machine incorporating a gas-flushed beam-guiding chamber (3), an optical element (2, 14) located in and providing the end of the beam-guiding chamber (3) on the beam-input side and serving to direct the laser beam (4) along the length of the beam-guiding chamber (3), a flushing gas intake opening (10, 13, 15) provided into the beam-guiding chamber (3) near the optical element (2, 14), an optical diaphragm (7, 21) with an aperture (9, 23) provided in the beam guiding chamber (3) for shaping the laser beam (4) and also serving as a restrictor for flow of the flushing gas passing therethrough, and a focussing device (5, 14, 19) focussing the laser beam in the direction of the diaphragm aperture disposed within said chamber.

2. The laser processing machine in accordance with claim 1 wherein said diaphragm (7, 21) is positioned within the Rayleigh length from the neck of the laser beam focussed by the focussing device.

3. A laser processing machine in accordance with claim 1 wherein said focussing device (5, 19) is integrated with the optical element (14).

4. The laser processing machine in accordance with claim 1 wherein said intake opening directs the flushing gas flowing into the beam guiding chamber over the surface of the optical element.

5. A laser processing machine in accordance with claim 1 wherein the diaphragm (7, 21) is positioned at a distance within the Rayleigh length from the neck of the laser beam (6) focussed by the focussing device (5, 14, 19).

6. A laser processing machine in accordance with claim 1, wherein there is included a control device (8) for adjusting the diaphragm aperture (9, 23).

7. A laser processing machine in accordance with claim 1, wherein the diaphragm aperture (9, 23) is circular and its diameter is smaller than $$\frac{4\sqrt{2}\,f\lambda}{\pi dK}$$ when the diaphragm is positioned at the neck of the laser beam or $$\frac{8f\lambda}{\pi dK}$$ when the diaphragm is positioned within the Rayleigh length wherein f is the focal length of the focussing device, d is the diameter of the laser beam and K is the characteristic factor of the beam.

8. A laser processing machine in accordance with claim 1 wherein the intake opening (10, 13, 15) directs the flushing gas flowing into the beam guiding chamber (3) at the optical element (2, 14) in a flow path generally parallel to the surface of the optical element (2,14).

9. A laser processing machine as in accordance wit claim 1 wherein the aperture (21) is provided by in a cutting-gas nozzle on the cutting head (18) of the laser processing machine and that wherein the flushing gas also serves as a processing gas in the laser cutting process.

10. A laser processing machine incorporating a gas-flushed beam guidance chamber, a laser processing machine incorporating a gas-flushed beam-guiding chamber (3), an optical element (2, 14) located in and adjacent the end of the beam-guiding chamber (3) on the beam-input side and serving to direct the laser beam (4) along the length of the beam-guiding chamber (3), a flushing gas intake opening (10, 13, 15) provided into the beam-guiding chamber (3) near the optical element (2, 14), an optical diaphragm (7, 21) with an aperture (9, 23) provided in the beam guiding chamber (3) for shaping the laser beam (4) and also serving as a restrictor for flow of the flushing gas passing therethrough, and a focussing device (5, 14, 19) focusing the laser beam in the direction of the diaphragm aperture disposed within said chamber, said diaphragm aperture (9, 23) being circular and having a diameter smaller than $$\frac{4\sqrt{2}\,f\lambda}{\pi dK}$$ when the diaphragm is positioned at the neck of the laser beam or $$\frac{8f\lambda}{\pi dK}$$ when the diaphragm is positioned within the Rayleigh length and wherein f is the local length of the focussing device, d is the of the laser beam and K is the characteristic factor of the beam.

11. A method for protecting an optical element (2, 14) in a laser beam path in a gas-flushed beam-guiding chamber (3) for a laser beam (4) comprising:
 a) providing a beam guiding chamber (3), an optical element (2, 14) in the beam guiding chamber located at the end of the chamber on the beam input side, and an optical diaphragm with an aperture (9, 23) therein spaced from said optical element and adjacent the beam output end of said chamber for shaping the laser beam,
 b) providing a laser beam which is directed along the length of said chamber by said optical element,
 c) introducing a flushing gas into said chamber adjacent said optical clement to protect said optical element from contaminants, and
 d) focussing the laser beam in the direction of said diaphragm, said diaphragm aperture also serving as a flow restrictor for the flushing gas.

12. The method for protecting an optical element in accordance with claim 11 comprising wherein there is also included in said the laser beam path a cutting nozzle at least a portion of the beam guiding chamber, said nozzle including a cutting-gas tip functioning both as the optical aperture (2) for the laser beam (4) and as a restrictor for the flushing gas flashing the beam guiding chamber (3), and wherein said flushing gas also serves as a processing gas during the cutting operation.

13. A laser processing machine incorporating a gas-flushed beam-guiding chamber, an optical element (2, 14) located in and adjacent the end of the beam-guiding chamber (3) on the beam-input side and serving to direct the laser beam (4) along the length of the beam-guiding chamber (3), a flushing gas intake opening (10, 13, 15) provided into the beam-guiding chamber (3) near the optical element (2, 14), an optical diaphragm (7, 21) with an aperture (9, 23) provided in the beam guiding chamber (3) for shaping the laser beam (4) and also serving as a restrictor for flow of the flushing gas passing therethrough, and a focussing device (5, 14, 19) focusing the laser beam in the direction of the diaphragm aperture disposed within said chanter, said diaphragm being positioned within the Rayleigh length from the neck of the laser beam focussed by the focussing device.

* * * * *

UNITED STATES PATENT AND TRADEMARK OFFICE
CERTIFICATE OF CORRECTION

PATENT NO. : 6,624,386 B2
DATED : September 23, 2003
INVENTOR(S) : Michael VonBorstel It is certified that error appears in the above-identified patent and that said Letters Patent is hereby corrected as shown below:

Column 7,
Line 17, "wit" should be -- with --.

Column 8,
Line 22, delete "comprising";
Line 23, delete "said".
Line 42, "chanter" should be -- chamber --.

Signed and Sealed this

Twenty-third Day of March, 2004

JON W. DUDAS
*Acting Director of the United States Patent and Trademark Office*